Figure 1:
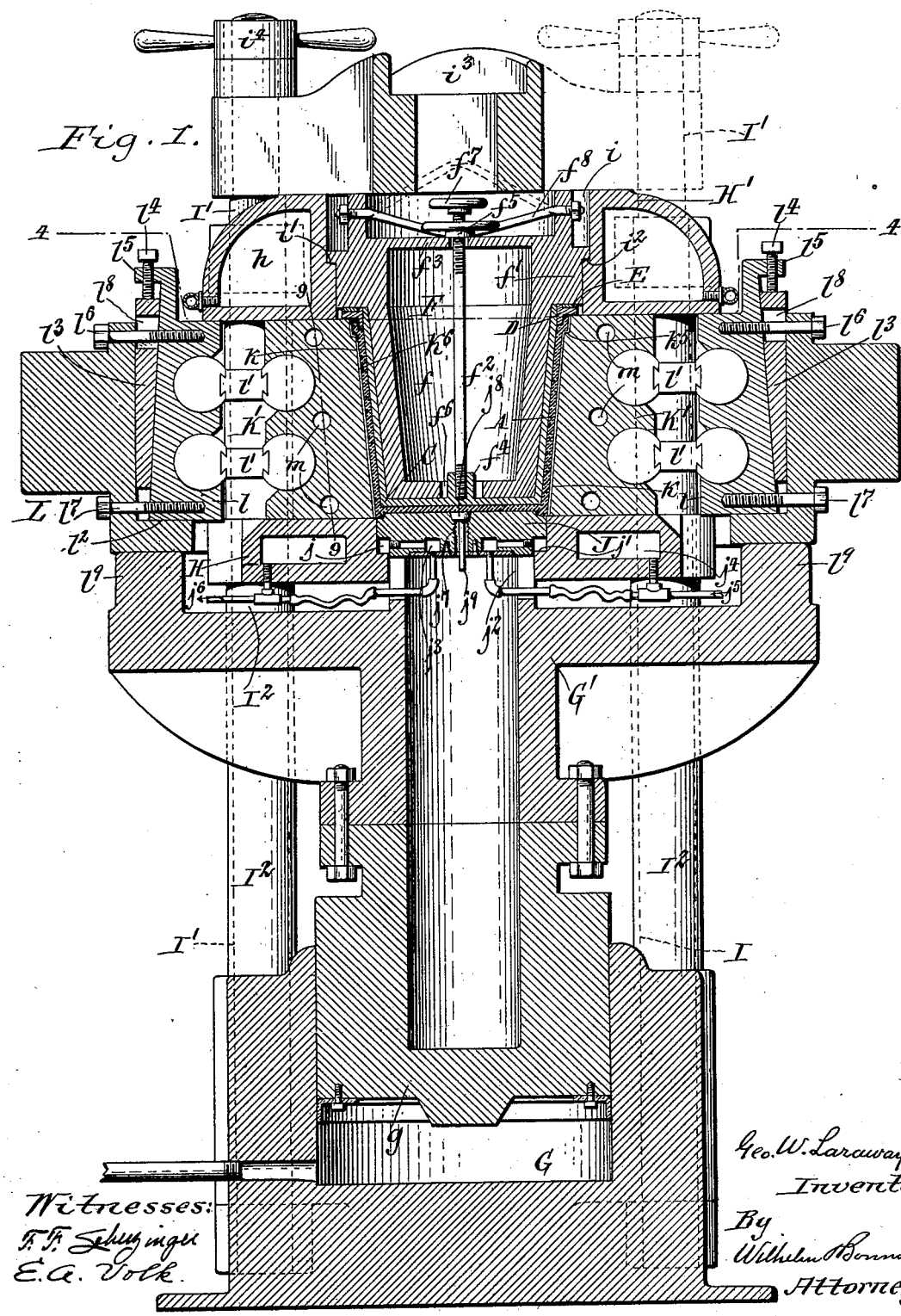

No. 666,811. Patented Jan. 29, 1901.
G. W. LARAWAY.
MACHINE FOR MAKING VESSELS FROM FIBROUS COMPOSITIONS.
(Application filed May 31, 1900.)
(No Model.) 5 Sheets—Sheet 2.

Witnesses:
F. F. Schuyinger.
E. A. Volk.

Geo. W. Laraway,
Inventor.
By Wilhelm Bonner
Attorneys.

No. 666,811. Patented Jan. 29, 1901.
G. W. LARAWAY.
MACHINE FOR MAKING VESSELS FROM FIBROUS COMPOSITIONS.
(Application filed May 31, 1900.)
(No Model.) 5 Sheets—Sheet 3.
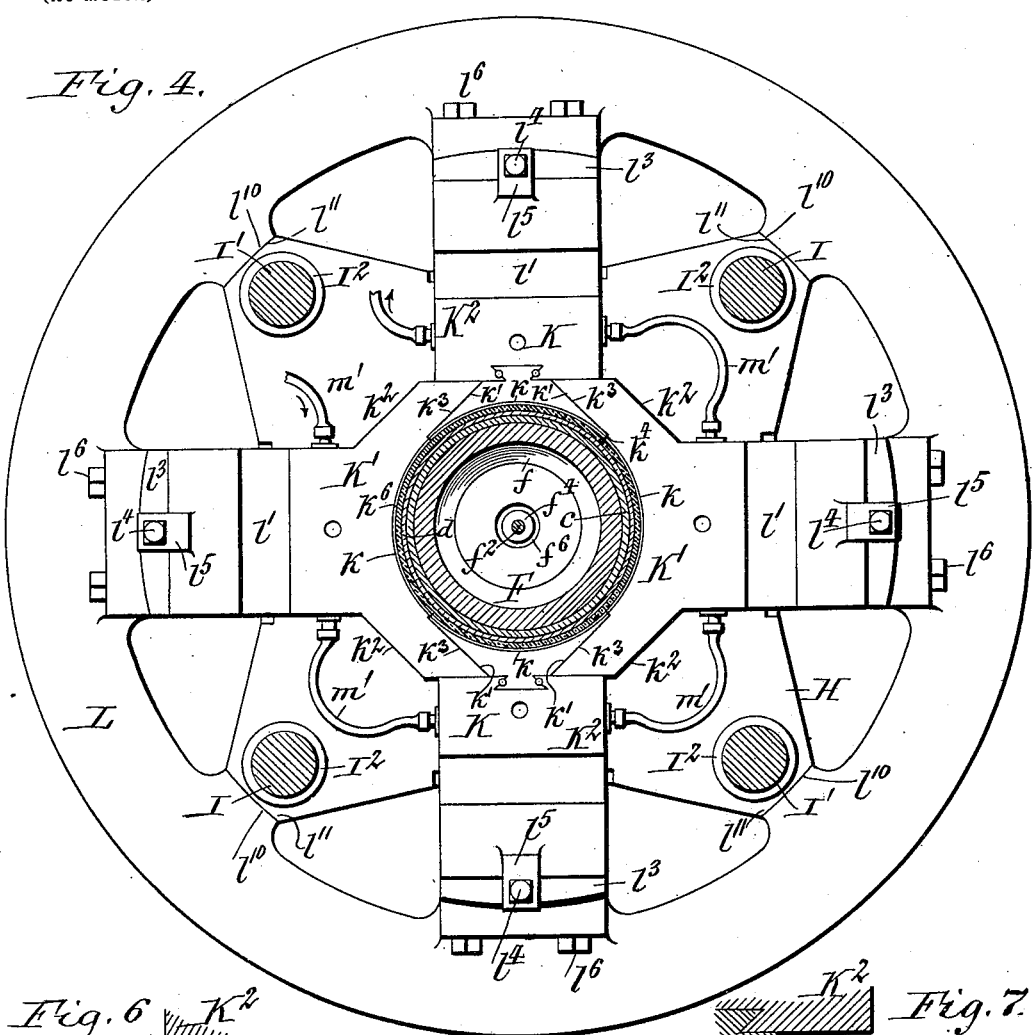
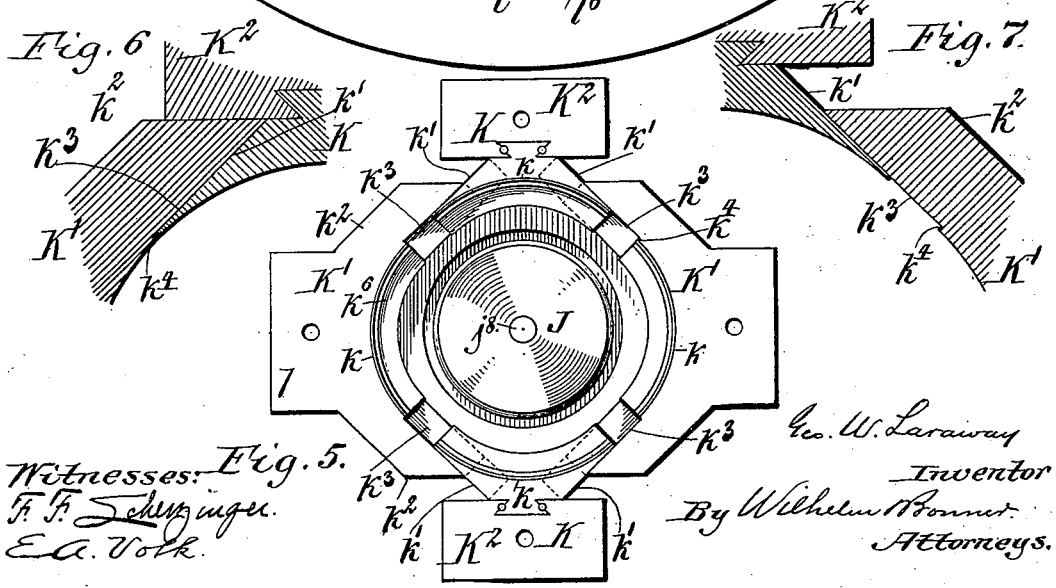

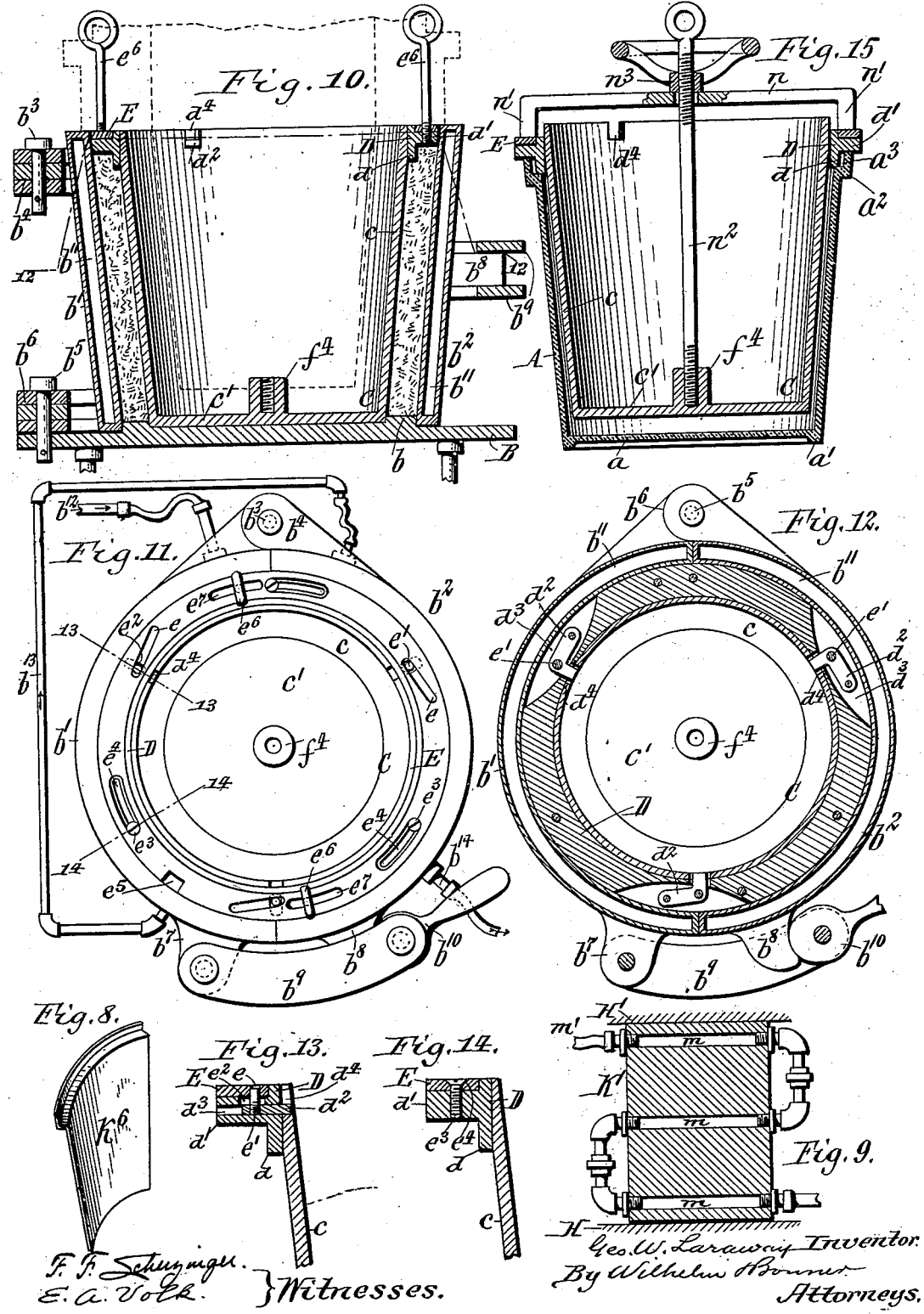

No. 666,811. Patented Jan. 29, 1901.
G. W. LARAWAY.
MACHINE FOR MAKING VESSELS FROM FIBROUS COMPOSITIONS.
(Application filed May 31, 1900.)
(No Model.) 5 Sheets—Sheet 5.
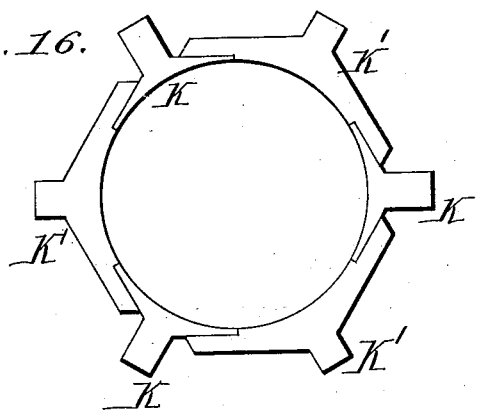
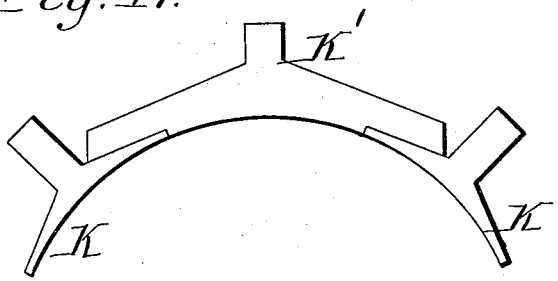
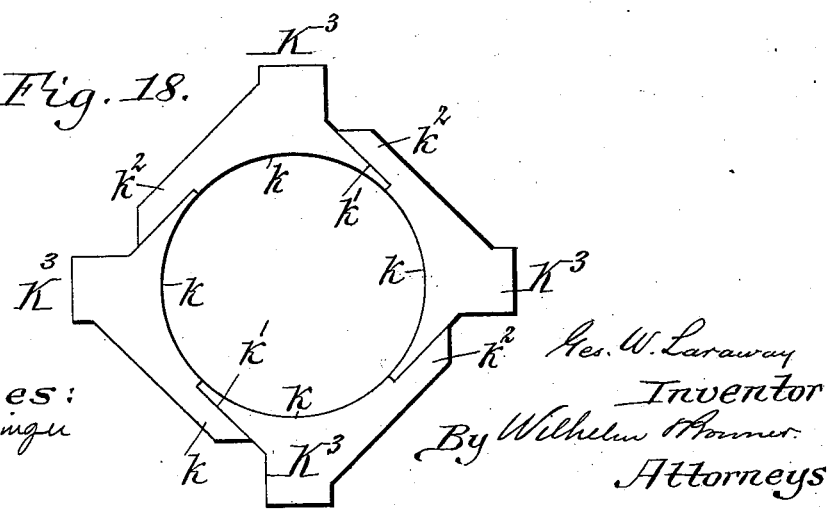
Witnesses:
F. F. Schirzinger
E. A. Volk.
Geo. W. Laraway
Inventor
By Wilhelm Bonner
Attorneys

UNITED STATES PATENT OFFICE.

GEORGE W. LARAWAY, OF NEW YORK, N. Y., ASSIGNOR TO THE NATIONAL PACKAGE COMPANY, OF GLENS FALLS, NEW YORK.

MACHINE FOR MAKING VESSELS FROM FIBROUS COMPOSITIONS.

SPECIFICATION forming part of Letters Patent No. 666,811, dated January 29, 1901.

Application filed May 31, 1900. Serial No. 18,628. (No model.)

*To all whom it may concern:*

Be it known that I, GEORGE W. LARAWAY, a citizen of the United States, residing in the city of New York, borough of Manhattan, in the county and State of New York, have invented new and useful Improvements in Machines for Making Vessels from Fibrous Compositions, of which the following is a specification.

This invention relates to that class of apparatus which is employed for molding and pressing hollow ware or vessels from fibrous compositions or materials. The apparatus shown in the drawings is designed more especially for the manufacture of hollow ware from a fibrous composition which is composed of finely-divided ingredients in a dry state, one of which ingredients is a fusible cementing agent—for instance, rosin—so that the particles of the composition are caused to adhere to each other by applying sufficient heat to the mold to melt the cementing ingredient, while the composition becomes hard and set by subsequent cooling. The apparatus shown in the drawings is designed more especially for producing vessels which have an open-topped body and a bottom formed integrally with the body—for instance, butter-tubs, pails, and the like. In manufacturing vessels of this style from such compositions the most desirable method consists in first molding the body sufficiently to retain its shape and in then forming the bottom and at the same time compressing the body and bottom so as to compact or condense the previously-molded body and the bottom and to unite the bottom to the body. The apparatus shown in the drawings is designed to carry out this method, and consists of a preliminary molding apparatus in which the body is molded loosely, but sufficiently to retain its general shape, and a pressing apparatus in which the bottom is formed and the previously-molded body is compressed and united to the bottom.

The objects of my invention are to produce a pressing apparatus which is simple in construction and effective and convenient in operation, and also to produce a simple and convenient preliminary molding apparatus for shaping the body, part of which molding apparatus can be used in connection with the pressing apparatus for completing the vessel in the latter.

Figure 2:
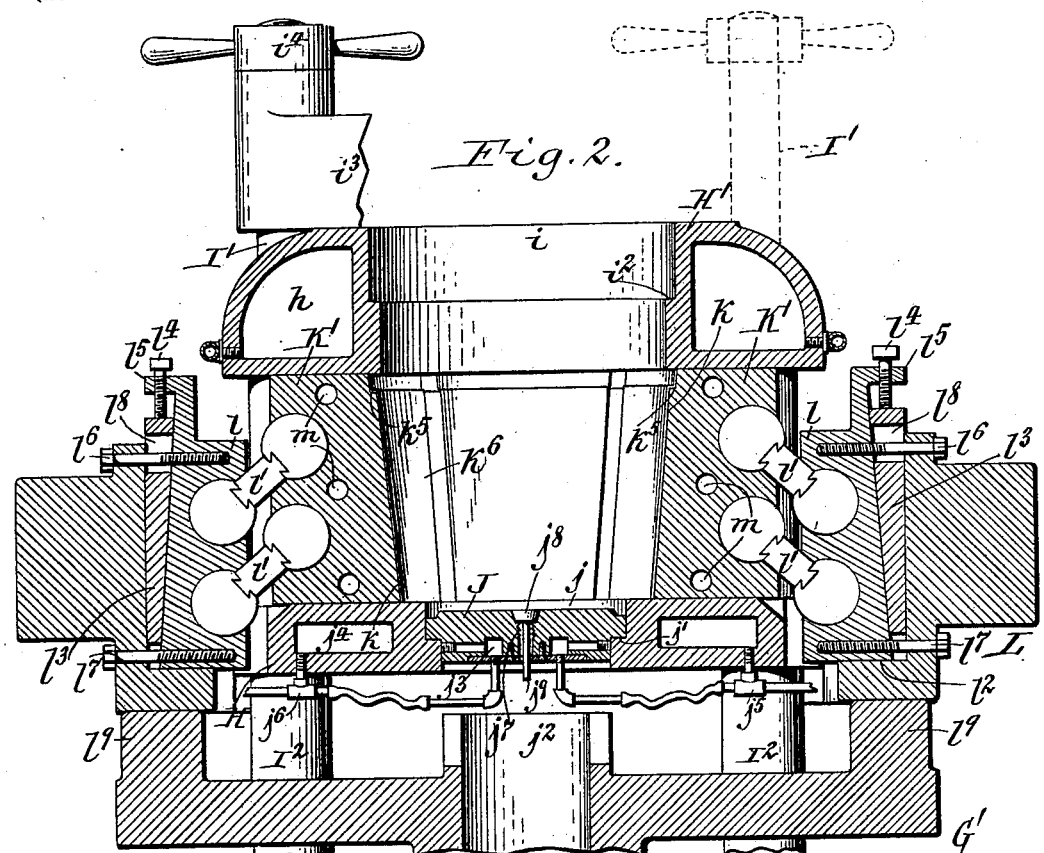
Figure 3:
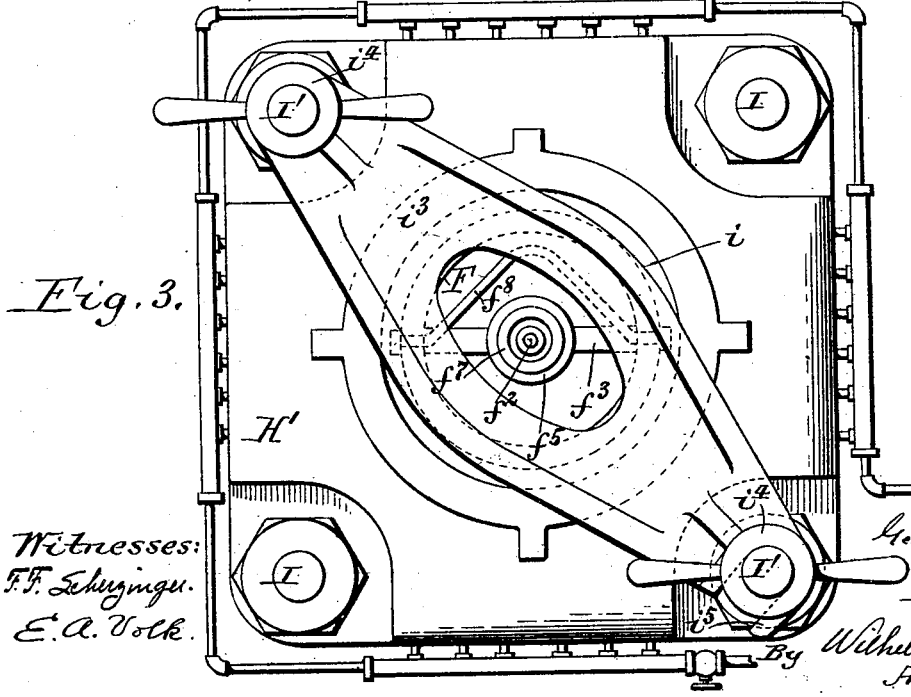

In the accompanying drawings, consisting of five sheets, Figure 1 is a vertical section of the pressing apparatus, showing the position assumed by the parts when a vessel has been pressed. Fig. 2 is a fragmentary sectional elevation of the upper portion of the pressing apparatus, showing the parts in the position which they assume when the press has been opened or relaxed and is ready for the introduction of a molded-vessel body. Fig. 3 is a top plan view of the machine corresponding to Fig. 1. Fig. 4 is a horizontal section in line 4 4, Fig. 1, showing the presser-staves contracted and pressing a molded vessel against the former. Fig. 5 is a detached top plan view of the presser-staves and the bottom-die, showing the presser-staves expanded into the position corresponding to Fig. 2. Fig. 6 is a fragmentary horizontal section, on an enlarged scale, of the joint between two adjacent presser-staves of a set of four staves and showing the staves in the contracted position. Fig. 7 is a similar view showing the staves in the expanded position. Fig. 8 is a perspective view of one of the sheet-metal face-plates which are applied to the inner sides of the staves to prevent the vessel from adhering to the same. Fig. 9 is a fragmentary vertical section in line 9 9, Fig. 1, showing the means for heating each stave. Fig. 10 is a vertical section of the preliminary molding apparatus. Fig. 11 is a top view of the same. Fig. 12 is a horizontal section in line 12 12, Fig. 10. Figs. 13 and 14 are fragmentary vertical sections, on an enlarged scale, in lines 13 13 and 14 14, Fig. 11. Fig. 15 is a vertical section showing the means for detaching or stripping the finished vessel from the former. Fig. 16 is a top view of a set of six presser-staves. Fig. 17 is a top view showing one wing stave and two intermediate staves of a set of eight. Fig. 18 is a top view showing a modified construction of the presser-staves.

Like letters of reference refer to like parts in the several figures.

The particular style of vessel which is produced by the apparatus shown in the drawings is a butter-tub and has a downwardly-tapering body A, a bottom $a$, provided with a depending marginal flange or rim $a'$, and an external annular top rim $a^2$, having an internal chime or rabbet $a^3$, as shown in Fig. 15.

The preliminary molding apparatus, in which the body A is molded loosely, but sufficiently to retain its general shape before it is placed in the pressing apparatus, is shown in Figs. 10 to 14 and is constructed as follows:

B represents a molding-table, which is provided on its upper side with an annular centering rib or flange $b$.

$b'$ $b^2$ represent semicircular mold-sections which constitute the outer or inclosing portion of the mold and which have their inner sides shaped to correspond with the shape of the vessel to be formed. These sections bear in their closed position at their lower ends against the outer side of the centering-flange $b$ on the molding-table. The rear ends of these mold-sections are pivotally connected to each other and to the table in any suitable manner—for instance, by a vertical pintle $b^3$, connecting overlying ears $b^4$ on the upper parts of the sections, and a vertical pintle $b^5$, passing through overlying ears $b^6$ on the lower parts of the sections and through the table, as represented in Figs. 10 to 12. The front ends of the mold-sections are detachably connected by any suitable clamping device. The device shown in the drawings for that purpose consists of two lugs $b^7$ $b^8$, arranged on the mold-sections on opposite sides of the front joint between the same, two links $b^9$, pivoted to one of said ears, and a tightening cam-lever $b^{10}$, pivoted to the free ends of said links and adapted to engage against the outer side of the other ear. When the two outer mold-sections have been closed against each other, the links $b^9$ are swung inwardly, so as to permit the cam-lever $b^{10}$ to be engaged with the lug $b^8$, and upon subsequently turning the cam-lever in the proper direction the lever draws the two sections tightly together. Each of the outer mold-sections is provided with a chamber or jacket $b^{11}$ for the reception of a heating or cooling agent, such as steam or cold water. The heating or cooling agent is introduced by an inlet-pipe $b^{12}$ into one end of the chamber in one section and is conducted from the opposite end of this chamber by an intermediate pipe $b^{13}$ to one end of the chamber in the other section and is then drawn off from the opposite end of this chamber by an outlet-pipe $b^{14}$. Each of these pipes is provided with a flexible portion which permits the mold-sections to be opened and closed without disturbing the connections of the pipes.

C represents a shell which constitutes the inner portion of the mold. This shell is composed of a tapering body $c$, which conforms in its external shape to the inner side of the body of the vessel, and a flat bottom $c'$. The shell is placed upon the molding-table within the centering-flange, so that an annular space is formed between the shell and the outer mold-sections. The shell is of such height that when it rests upon the table its top is about flush with the top of the outer mold-sections.

D represents an annular forming-frame which closes the upper end of the annular space between the shell and the outer mold-sections and which forms the top part of the mold and shapes the upper end of the vessel. This frame is provided with an inner flange $d$, which extends downwardly along the outer side of the shell and molds the internal chime $a^3$ on the upper edge of the vessel, and with a horizontal flange $d'$, which projects outwardly from the upper end of the downwardly-projecting flange and molds the upper edge of the vessel, as represented in Figs. 1 and 10. This forming-frame may be detachably supported upon the forming-shell by any suitable means. The preferred means for this purpose consists of catches $d^2$, which are arranged in recesses $d^3$ in the frame and pivoted so as to swing horizontally, as represented in Figs. 12 and 13. These catches are adapted to project with their free ends from the inner side of the forming-frame into engagement with the bottom of notches $d^4$, formed in the upper edge of the shell. The catches are shifted horizontally, so that their free ends project from the inner side of the frame or are retracted outwardly beyond the inner side of the frame by an oscillating cam-ring E, which turns on the upper side of the forming-frame. This cam-ring is provided with cam-slots $e$, and each of the catches $d^2$ is provided with a pin $e'$, which projects upwardly through a transverse slot $e^2$ in the forming-frame into one of the cam-slots $e$ of the cam-ring, as represented in Figs. 11, 12, and 13. Upon turning the cam-ring in one direction its cam-slots move the catches so that their free ends project from the inner side of the forming-frame, and upon turning the cam-ring in the opposite direction the catches are turned so that their free ends are withdrawn outwardly beyond the inner side of the forming-frame. The cam-ring is confined upon the top of the forming-frame and prevented from becoming detached therefrom by means of screws $e^3$, secured to the frame and passing through segmental slots $e^4$, arranged in the cam-ring, as shown in Figs. 11 and 14. The cam-ring may be turned in any suitable way—for instance, by means of a handle or wrench, which is inserted into a notch $e^5$ in the side of the ring. (Shown in Fig. 11.) Before placing the forming-frame between the shell and the outer parts of the mold the cam-ring is turned so as to project the catches from the inner side thereof and permit the same to be engaged in the notches of the shell for supporting the forming-frame and the parts mounted thereon in the proper position to mold the vessel. In order to permit this ring to be conveniently manipulated, handles $e^6$ are provided, which are preferably screwed with their lower ends into the forming-frame, as represented in Fig. 10. The cam-ring is provided with segmental slots $e^7$ above the openings for the handles, as shown in Fig. 11, in order to permit the handles to be freely attached to and removed from the forming-frame without interfering with the operation of the cam-ring. When the forming-frame and cam-ring are properly attached to the shell, the upper sides of the forming-frame and the cam-ring mounted thereon are flush with the top of the shell and the surrounding sectional mold.

F is a core which is arranged in the shell C for heating the interior of the mold during the preliminary molding operation and for afterward sustaining the pressure which is applied to the shell and vessel in the pressing apparatus. This core is hollow and its walls are of sufficient thickness to sustain the heavy pressure developed in the pressing apparatus. The lower body part $f$ of this core fits closely into the shell C, and the core is provided at the upper end of its body part with an enlarged head, which has at its junction an outwardly-projecting annular flange $f'$. The latter fits against the upper edge of the shell, the forming-frame, and the cam-ring, as represented by full lines in Fig. 1 and by dotted lines in Fig. 10.

The operation of molding the body of the vessel is conducted as follows: The outer mold-sections and the inner shell are placed on the forming-table on opposite sides of the centering-flange and the outer mold-sections are locked, as shown in Figs. 10, 11, and 12. The annular space formed in the mold between the shell and the outer sections is then filled with the fibrous composition, which is of a loose, flocculent, or pulverulent character. After the space has been so filled it is closed at the top by the forming-frame, which rests by its catches on the shell. The mold is thoroughly heated for melting the fusible ingredient of the composition. For this purpose the core, which has been previously heated, is placed in the shell. The forming-frame is also heated before applying it to the shell, and the outer mold-sections are heated by supplying steam to the jackets of the same. When the composition has been sufficiently heated, the steam is shut off from the mold-sections and the latter are cooled by supplying cold water to their jackets. This chills the outer sections and causes the external portion of the vessel-body to set and harden, while its internal portion, which lies nearer the heated core, remains soft and adhesive. This causes the body to adhere to the shell, while the body has sufficiently set to retain its shape, although it is still rather loose in texture. The outer mold-sections are now released and opened, and the shell containing the core and having the vessel-body adhering to its outer side and carrying the forming-frame and cam-ring is removed from the mold and placed in the pressing apparatus.

The shell and core may be connected by any suitable means to permit these parts to be lifted from the molding-table and placed in the press. The devices for this purpose (shown in Figs. 1, 3, and 4) consist of a clamping-rod $f^2$, which passes through a cross-bar $f^3$ in the upper part of the core and which engages with its lower screw-threaded end into a boss $f^4$ on the bottom of the shell, and a clamping screw-nut $f^5$, arranged upon the threaded upper portion of the clamping-rod and bearing against the upper side of the cross-bar $f^3$ of the core. The boss on the bottom of the shell projects upwardly through an opening $f^6$ in the bottom of the core, and the upper end of the clamping-rod is provided with a handle $f^7$ for turning the same, as shown in Fig. 1. The upper end of the core is provided with a pivoted bail $f^8$, which is swung upwardly into the position shown in dotted lines, Fig. 1, and attached to a lifting or transfer crane, whereby the core and the parts attached thereto are carried from the forming-table to the press. This lifting or transferring crane or apparatus may be of any suitable construction and is not shown in the drawings.

The press, in which the body of the vessel is compacted and the bottom of the vessel is formed and united with the body, is shown in Figs. 1 to 9. This press is of that type in which horizontally-movable presser staves or sections are arranged around a former and are moved toward and from the latter, so that the wall of the vessel on the former is compressed by the inward movement of these staves, which are guided between an upper and a lower stationary plate and in which this upper stationary plate is provided with an opening through which the former is introduced from above into the space between the presser-staves, and the lower stationary plate is provided with an opening in which a die is arranged which by its upward movement forms and compresses the bottom of the vessel. This press is constructed as follows:

G represents an upright hydraulic cylinder which is provided with a vertically-movable plunger or piston $g$.

G' represents a presser head or spider which is secured to the upper end of the plunger.

H represents the lower supporting-plate, which is arranged horizontally above the presser-head, and H' is the upper supporting-plate, which is supported horizontally above the lower plate and separated therefrom by an intervening space in which the presser-staves are arranged. The upper and lower supporting-plates H H' are rigidly connected with each other and with the hydraulic cylinder by columns I I', surrounded by spacing-sleeves $I^2$. The top plate H' is provided with a central opening $i$, through which the core, with the shell carrying the vessel-body and the forming-frame, is lowered into the press. The core is supported in the opening of the top plate by an annular shoulder $i'$, formed on the upper part or head of the core and resting upon a shoulder $i^2$ in the opening $i$, as shown in Fig. 1. When the core is in this position, its upper end is flush with the upper surface of the top plate. The core is firmly locked in this position, so as to resist the upward pressure which is subsequently applied to the lower end thereof. A clamping device (shown in Figs. 1, 2, and 3) is employed for this purpose, and consists of a cross-head $i^3$, which is arranged across the top plate and the core and connected at its ends to the upper ends of the diametrically opposite columns $I'$ of the press. The columns $I'$ $I'$, which receive the cross-head $i^3$, are somewhat longer for this purpose than the columns I I, which simply connect with the top plate, and the cross-head is firmly held down upon the top of the top plate and core by screw-nuts $i^4$, applied to the upper screw-threaded ends of the columns $I'$ $I'$. The cross-head is pivoted to one of the columns $I'$ and is detachably connected with the other column $I'$ by a jaw $i^5$, which embraces this column. This construction permits the cross-head to be conveniently swung to one side, so as to clear the opening in the top plate $H'$ and permit the insertion and removal of the core and vessel and at the same time provides a construction of sufficient strength to resist the upward pressure applied to the bottom of the core. Before applying the cross-head to the upper end of the core the supporting-bail $f^8$ of the latter is turned down, as shown in full lines, Fig. 1.

J, Figs. 1, 2, and 5, represents a vertically-movable die whereby the bottom of the vessel is formed and pressed. This bottom-die is of circular form and guided in a circular opening $j$ in the center of the lower plate H and its upper side is shaped according to the form it is desired to give the bottom of the vessel. In its lowermost position the bottom-die is arranged with its upper side below the upper side of the lower plate H of the press. In this position the bottom-die rests with its marginal portion upon an annular shoulder $j'$, formed in the central opening of the lower plate H. The bottom-die is raised by an upwardly-projecting hub $j^2$, formed centrally upon the presser-head $G'$ of the plunger. The bottom-die is provided with a heating-chamber $j^3$, and the lower plate H is also provided with a heating-chamber $j^4$. These chambers are connected with a steam-supply pipe $j^5$, whereby steam is conducted to these chambers for heating these parts, and with a drain-pipe $j^6$, by which the water of condensation is carried off. The hub $j^2$ of the plunger is notched to clear these pipes when it rises up to the bottom-die. These pipes are provided with flexible sections to permit the bottom-die to rise and fall without disturbing these connections. The bottom-die is inserted into the central opening of the lower supporting-plate from above and is removed upwardly when required. In order to permit the bottom-die to be conveniently manipulated in inserting and removing it, the same is provided with a central screw-threaded socket $j^7$ for the reception of a screw-eye which is attached to the hoisting mechanism. When the machine is in use, this socket is closed by a conical plug $j^8$, which fits a conical seat at the upper end of the socket and is flush with the top of the bottom-die. This plug is secured in place by a driving fit and is provided with a depending stem $j^9$, which extends below the bottom-die and which permits of driving the plug from its seat by striking against the lower end of its stem. The upper supporting-plate $H'$ of the press is provided with a heating-chamber $h$, which is connected with a steam-supply pipe.

K K and $K'$ $K'$ represent the presser staves or sections, which are arranged between the upper and lower supporting-plates H $H'$ and around the central openings thereof. These staves are capable of inward and outward movement between the plates H $H'$, and their inner faces $k$ are shaped to correspond with the external shape of the vessel to be formed. In the construction represented in Figs. 1 and 7 a set of four staves is used and the presser-face $k$ of each stave covers one-fourth of the circumference of the vessel when the latter is pressed. The four staves are arranged in two pairs and the two staves of each pair are arranged diametrically opposite each other. Each of the two staves K has in rear of its presser-face $k$ two outwardly-converging slide-faces $k'$, which are arranged at an angle of forty-five degrees to the line of movement of the stave. These slide-faces $k'$ are arranged as near to the edges of the presser-face as the strength of the material will allow and extend from the side edges of the presser-face convergingly to the body $K^2$ of the stave. The face portion of these staves containing the presser-face and the slide-faces is preferably made separate from the body portion and secured to the latter by a dovetail fastening, as shown in Fig. 5. Each of the staves $K'$ has wings $k^2$, which extend laterally beyond the presser-face of the stave and which overlap the side portions of the staves K, on the rear or outer side thereof. Each of these wings is provided with a slide-face $k^3$, which bears against the slide-face $k'$ of the adjacent stave K. The wings $k^2$ of the wing-staves $K'$ form backings or supports for the tapering edge portions of the intermediate staves K, and the respective slide-faces $k'$ $k^3$ are of such length that the sliding joints formed thereby do not open when the staves have been fully expanded, so that the material to be pressed is at all times confined. In contracting and expanding the staves each stave moves at right angles to the adjacent staves and maintains a close contact with the adjacent staves by the slide-faces.

When a greater number of staves than four are used in a set—for instance, six, as represented in Fig. 16, or eight, as represented in Fig. 17—the angle of the slide-faces is changed accordingly. In each case both slide-faces incline or converge outwardly with reference to the line of movement of the stave and the slide-faces of adjoining staves are arranged at the same angle to the respective lines of movement of the two staves. This rule makes the angle of the slide-faces forty-five degrees in a set of four staves, sixty degrees in a set of six staves, and 67.5 degrees in a set of eight staves. By arranging the slide-faces in this manner they remain in close contact during a uniform inward and outward movement of the staves. The latter are thereby enabled to be each operated by positive means and all radially and at the same speed and do not require any other or additional guide devices, as the slide-faces cause the staves to move inwardly and outwardly in a radial direction. Heretofore the system of presser-staves in such presses has been composed of main staves and of intermediate or inter staves which close the joints between the main staves. These interstaves have in some cases been moved inwardly by the main staves and have been retracted by springs, and in other cases all of the staves have been moved by positive devices, but at a different speed, the interstaves being moved faster than the main staves. By the present construction such specially-operated interstaves are dispensed with and all of the staves, the wing-staves as well as the wingless intermediate staves, are operated positively and at the same speed, thereby rendering the mechanism simple and very reliable and reducing the friction. Instead of constructing alternate staves with wings and without wings, so that the set of staves is composed of alternate wing-staves and intermediate staves without wings, as shown in Figs. 4 to 7, 16 and 17, each stave may be provided with a wing $k^2$ on one side of its presser-face $k$ and with a rear slide-face $k'$ on the other side, as shown in Fig. 18, in which case all the staves $K^3$ of the set are alike in construction.

The side edges of the presser-faces of the staves K are preferably blunt in order to maintain the same of sufficient strength to prevent injury, and the slide-faces $k^3$ of the wings $k^2$ are set back correspondingly, forming shoulders $k^4$ at the junction of the wings $k^2$ with the presser-face $k$ for the reception of these blunt side edges.

The upper portion of the bearing-face of each stave is provided with a rabbet $k^5$, and these rabbets of the several staves form the external bead or rim $a^2$ on the upper end of the vessel while being pressed.

When the staves are new, the composition has a tendency to stick to the staves; but after the staves have been used for some time the pores of the staves become filled and the sticking ceases. In order to prevent the composition from sticking to the staves, each of the staves is provided on its pressing-face with a curved face-plate $k^6$, of sheet metal, Figs. 1, 2, 4, 5, and 8, which is shaped to conform to the presser-face of the stave. If these face-plates adhere to the vessel, they are removed from the machine with the pressed vessel and are subsequently detached from the vessel and replaced on the faces of the staves to be used over again.

The staves are moved inwardly and outwardly positively by any suitable mechanism, preferably by a toggle mechanism, which is constructed as follows:

L represents a vertically-movable toggle-ring which surrounds the staves and which is provided on its inner side with chairs $l$, each of which is connected with the corresponding stave by a pair of vertically-swinging toggle-bars $l'$. These chairs rest upon horizontal ledges $l^2$, formed on the inner side of the toggle-ring. Upon raising the toggle-ring the toggle-bars are straightened and the presser-staves are moved inwardly to the position shown in Figs. 1 and 4, and upon lowering the toggle-ring the staves are moved outwardly, as represented in Fig. 2. In order to permit of varying the extent of the inward movement of the staves, and thereby varying the thickness of the article to be pressed, the chairs of the toggle-ring are attached to the toggle-ring so as to be capable of radial adjustment thereon. The preferred devices for effecting this adjustment of the chairs are constructed as follows:

$l^3$ represents downwardly-tapering wedges, one of which is interposed between the outer side of each toggle-chair and the inner side of the toggle-ring. Upon moving these wedges downwardly the chairs are adjusted inwardly, whereby the staves are moved nearer the center upon straightening the toggles, while upon raising the wedges the chairs are shifted outwardly and the staves are moved inwardly to a less extent upon straightening the toggles. These wedges are adjusted vertically by screws $l^4$, arranged in overhanging ears $l^5$ on the chairs and bearing against the upper ends of the wedges, as represented in Figs. 1, 2, and 4. Each of the toggle-chairs is secured in position after adjustment by upper and lower screws $l^6\ l^7$, connecting the toggle-chair to the adjacent part of the toggle-ring. The lower screws connect the toggle chair and ring below the wedge, while the upper screws pass through vertical slots $l^8$ in the wedge, as represented in Figs. 1 and 2. The toggle-ring rests upon bosses $l^9$, arranged on the upper side of the presser-head G', and is centered and guided in its vertical movements by internal projections $l^{10}$, formed on the ring and bearing against the salient faces $l^{11}$ of the lower supporting-plate H, as represented in Fig. 4. The toggle-ring and the bottom-die are raised by the hydraulic plunger; but the downward movement of these parts is effected by gravity.

The staves are preferably provided with means for heating the same. The preferred means for heating the staves is shown in Figs. 1, 4, and 9 and consists of horizontal heating-passages $m$, formed in the staves, the several heating-passages in each stave being connected with each other and with the passages in the adjacent staves, as represented in Figs. 1, 2, 4, and 9. The heating-passages of adjacent staves are connected by flexible tubing $m'$, so as to permit the staves to contract and expand without interfering with the steam connections.

The operation of compressing the previously-molded body of the vessel, forming the bottom thereof, and uniting the same to the body is conducted as follows: The plunger of the press is lowered, together with the presser-head, bottom-die, and toggle-ring, thereby expanding the presser-staves. The cross-head $i^3$ is swung aside to expose the opening in the top plate H'. The parts of the press being properly heated, a suitable quantity of the fibrous composition for forming the bottom of the vessel is spread upon the bottom of the cavity inclosed by the staves, this bottom being formed by the bottom-die and the surrounding portion of the lower plate H. The fusible ingredient of the composition is melted by the heat applied to the parts of the press. The core carrying the shell and the molded body of the vessel is now lowered into the cavity inclosed by the staves and is secured by the cross-head $i^3$. In this position of the parts the former, composed of the core and shell, stands in such a relation to the presser-staves and bottom-die that the subsequent movement of the staves and die toward the former will produce a vessel having a body and a bottom of the desired thickness. The hydraulic plunger is now raised. The first part of the upward movement of the plunger moves the presser-staves inwardly, but does not raise the bottom-die, because the boss $j^2$ of the presser-head G' stands at a short distance below the bottom-die when the upward movement of the plunger begins, as shown in Fig. 2. The first part of the inward movement of the staves takes up the slack between the latter and the molded body of the vessel. After this slack is taken up the inward compression of the body begins and continues until the toggle-ring reaches the highest position. The compression of the body begins at the same time that the bottom-die is raised by the plunger and begins to shape and compress the bottom. The upward pressure exerted by the bottom-die toward the bottom of the former and the inward pressure exerted by the staves toward the body of the former compress the bottom and the body of the vessel and unite the two parts of the vessel, which are compressed uniformly and simultaneously. When the vessel has been pressed, the plunger is lowered, whereby the staves are retracted and the bottom-die is lowered. The cross-head is next released and swung aside, and the core, together with the shell and the pressed vessel adhering thereto, are raised out of the machine. The core is next removed from the shell upon detaching the clamping-screw $f^2$ from the shell. The cam-ring is now turned so as to detach its catches from the shell. The pressed vessel is finally stripped from the shell by pressing the forming-frame downwardly on the shell. The preferred means for effecting this movement of the forming-frame with reference to the shell is shown in Fig. 15 and consists of a cross-bar $n$, provided with two feet $n'$ $n'$, the latter engaged against the top of the forming-frame on opposite sides of the shell, a rod $n^2$, provided with a screw-threaded lower end engaging in the screw-threaded boss $f^4$ of the shell, and a screw-nut $n^3$, applied to the upper screw-threaded end of the rod $n^2$ and bearing against the upper side of the presser-bar. Upon tightening the nut $n^3$ upon the rod the cross-bar is moved downwardly with reference to the shell, and the forming-frame is moved downwardly against the upper edge of the pressed vessel and strips the latter from the shell.

An inferior way of forming the vessel consists in dispensing with the preliminary forming or molding of the body of the vessel in a separate mold and molding the vessel entirely in the press. In that case the plunger is lowered, so as to lower the bottom-die and expand the staves. A quantity of composition sufficient to form the bottom is then spread uniformly upon the bottom-die, and the shell is placed with its bottom upon this layer of composition. The annular space between the shell and the surrounding presser-staves is then filled with composition, the previously-heated forming-frame is attached to the upper end of the shell, and the previously-heated core is introduced into the shell and connected therewith. After the composition has been sufficiently softened by the heat the pressing is effected, as before described. It is preferable, however, to form the body of the vessel in a separate forming or molding apparatus, because the same can be done more conveniently and expeditiously in this manner, and, furthermore, the preliminary forming of each vessel can be effected while a previously-formed body is being pressed and united with its bottom in the press, thereby expediting the manufacture of these vessels.

I claim as my invention—

1. In a pressing apparatus, an annular series of presser-staves, each of which has on its inner side a presser-face and on opposite sides of its center line slide-faces by which contact is established with the adjoining staves, both slide-faces of each stave converging outwardly at equal angles to the axis or line of movement of the stave and at the same angle in every stave, whereby the slide-faces of adjacent staves remain in close contact when all of the staves are moved radially by positive means and at equal speed, substantially as set forth.

2. In a pressing apparatus, an external presser-stave having at its inner side a concave presser-face which stands at its middle at right angles to the center line of the stave, said center line being also the line in which said stave is movable, said stave having a wing which extends laterally beyond said presser-face and which is provided on its inner side with a slide-face which is arranged obliquely to said center line and which approaches said line in an outward direction, substantially as set forth.

3. In a pressing apparatus, an annular set of presser-staves composed of alternate wing-staves and wingless staves, the wing-staves having a presser-face and on opposite sides of said presser-face laterally-projecting wings provided on their inner sides with slide-faces, and said wingless staves having on their rear sides slide-faces which rest against the slide-faces of said wing-staves, the slide-faces of adjacent staves being inclined at the same angle to the respective lines of movement of the staves and converging outwardly, substantially as set forth.

4. In a pressing apparatus, the combination with an annular set of presser-staves, each of which has on opposite sides of its center line slide-faces which are inclined at the same angle to the line of movement of the stave and converge outwardly, of an actuating mechanism which is connected directly and positively with each stave and whereby all of the staves are moved inwardly and outwardly with equal speed, substantially as set forth.

5. In a pressing apparatus, the combination with an annular set of presser-staves composed of alternate wing-staves and wingless staves, said wing-staves having a presser-face and wings which project laterally beyond said presser-face and are provided on their inner sides with slide-faces, and said wingless staves having on their rear sides similar slide-faces which rest against the slide-faces of said wings, of an actuating mechanism which is connected directly and positively with each stave and whereby all of the staves are moved inwardly and outwardly with equal speed, substantially as set forth.

6. In a pressing apparatus, the combination with an annular set of presser-staves, each of which has on opposite sides of its center line slide-faces which are inclined at the same angle to the line of movement of the staves and converge outwardly, of toggle-bars of equal length connected with each of said staves, and an actuating-ring whereby all of the toggle-bars are moved simultaneously and with equal speed, substantially as set forth.

7. In a pressing apparatus, the combination with an annular set of presser-staves composed of alternate wing-staves and wingless staves, said wing-staves having on opposite sides of their presser-face laterally-projecting wings provided on their inner sides with slide-faces and said wingless staves having corresponding slide-faces on their rear sides, of toggle-bars of equal length connected with each of said staves, and an actuating-ring whereby all of the toggle-bars are moved simultaneously and with equal speed, substantially as set forth.

8. The combination with the lower horizontal plate provided with a central recess and a vertically-movable bottom-die arranged loosely in said recess, of an upper horizontal supporting-plate provided with a central opening, a former suspended in said opening, a cross-head detachably arranged upon said upper plate for locking the former down, presser-staves arranged between said supporting-plates, a presser-head arranged below said lower plate and provided with a central hub adapted to raise said bottom-die, a toggle-ring carried by said presser-head and surrounding said presser-staves, and toggle-bars connecting said ring with said presser-staves, substantially as set forth.

9. The combination with the lower horizontal supporting-plate provided with a central opening and having a shoulder within said opening, of a bottom-die resting normally on said shoulder with its upper surface below the top surface of said supporting-plate, substantially as set forth.

10. The combination with the lower horizontal supporting-plate provided with a central opening, a vertically-movable bottom-die supported in said opening, an upper supporting-plate, presser-staves arranged between said upper and lower plates, a toggle-ring surrounding said staves, and toggle-bars connecting said ring with said staves, of a vertically-movable presser-head which is arranged below said lower plate and which supports said toggle-ring, moving the same directly, and a lifting device for said bottom-die arranged on said presser-head and clearing said bottom-die when the latter is in its lowermost position, whereby the bottom-die is allowed to remain at rest while the initial inward movement of said presser-staves takes place and is raised while the presser-staves perform the remainder of their inward movement, substantially as set forth.

11. The combination with the lower horizontal supporting-plate provided with a central opening and a vertically-movable bottom-die arranged in said opening, of an upper supporting-plate, presser-staves arranged between said upper and lower plates, a toggle-ring surrounding said staves, toggle-bars connecting said ring with said staves, and a vertically-movable presser-head which is arranged below said lower plate and which carries said ring and is provided with a central hub arranged at a distance below said bottom-die and adapted to raise said die after the presser-staves have performed the first part of their inward movement, substantially as set forth.

12. The combination with the bottom-die having an internally-threaded perforation, of a plug arranged loosely in said perforation and provided with a stem projecting downwardly through said perforation, substantially as set forth.

13. The combination with the upper horizontal supporting-plate provided with a central opening for the introduction of the former and with a heating-chamber around said opening, the lower horizontal supporting-plate provided with a central opening for the bottom-die and with a heating-chamber around said opening, of a bottom-die provided with a heating-chamber and arranged in said opening, and presser-staves arranged between said upper and lower plates and provided with heating-passages, substantially as set forth.

14. The combination with the upper horizontal supporting-plate provided with a central opening having an internal shoulder, of a former provided in its upper portion with a projection by which it rests on said shoulder, and a laterally-movable cross-head pivotally mounted upon said supporting-plate and adapted to lock the former in said opening, substantially as set forth.

15. The combination with the upper horizontal supporting-plate provided with a central opening and the former arranged in said opening, of a lower horizontal supporting-plate, upright columns extending through said plates, a cross-head pivoted to one of said columns above the upper plate and provided with an open jaw by which it engages with the other column, and locking devices applied to said columns and bearing upon said cross-head, substantially as set forth.

16. The combination with the radially-movable presser-staves having presser-faces on their inner sides and a former arranged in the space inclosed by said staves, of an annular series of separate face-plates which are arranged loosely against the presser-faces of the staves and are free to adhere to the outer side of the molded vessel when the staves are withdrawn and which are separately removable from the vessel, substantially as set forth.

17. The combination with the former-shell, of an annular forming-frame surrounding the upper end of said shell, and catches which are movable in said frame toward and from said shell and whereby said frame is detachably connected with said shell, substantially as set forth.

18. The combination with the former-shell provided with notches in its top, of an annular forming-frame surrounding the upper end of said shell, catches attached to said frame and adapted to engage said shell, and a movable actuating-ring resting on said frame and engaging said catches, substantially as set forth.

19. The combination with the former-shell provided with notches in its top, of an annular forming-frame surrounding the upper end of said shell, catches pivoted to said frame and adapted to enter the notches of said shell, and a rotatable cam-ring arranged on said frame and engaging said catches to project or withdraw the same, substantially as set forth.

20. The combination with the former-core, of a former-shell fitted upon said core, means whereby said shell is detachably secured to said core, and an annular forming-frame surrounding the upper end of said shell and detachably connected therewith, substantially as set forth.

21. The combination with the former-core having an enlarged head which is connected with the body of the core by an overhanging annular shoulder, of a former-shell fitted upon said core below said shoulder, and an annular forming-frame surrounding said shell below said shoulder and detachably connected to said shell, substantially as set forth.

22. The combination with the former-core, of a former-shell applied to said core, and a screw-rod attached at its lower end to said shell and at its upper end to said core for detachably connecting the shell with the core, substantially as set forth.

23. The combination with the forming-shell having a screw-threaded socket in its bottom, of a former-core to which said shell is applied and which has in its bottom an opening which exposes said socket and near its top a cross-piece, and a screw-rod engaging with its lower end in said socket and provided at its upper end with a nut which bears upon said cross-piece, substantially as set forth.

Witness my hand this 23d day of May, 1900.

GEORGE W. LARAWAY.

Witnesses:
EUGENE S. ASHLEY,
EDWARD WILHELM.